United States Patent
Hör et al.

[11] Patent Number: 5,937,922
[45] Date of Patent: Aug. 17, 1999

[54] DISPENSING NOZZLE SEAL

[75] Inventors: Hartmut Hör, Mannheim; Joachim Heinemann, Groxheimertal; Reinhard Tinz, Gross-Biberau, all of Germany

[73] Assignee: Firma Carl Freudenberg, Weinham, Germany

[21] Appl. No.: 08/963,444

[22] Filed: Nov. 3, 1997

[30] Foreign Application Priority Data

Nov. 2, 1996 [DE] Germany ............... 196 45 173

[51] Int. Cl.⁶ .................................................. B65B 1/04
[52] U.S. Cl. ..................... 141/383; 141/312; 141/382; 141/391; 220/86.2
[58] Field of Search ................ 141/52, 59, 312, 141/382, 383, 386, 392, 391; 220/86.2

[56] References Cited

U.S. PATENT DOCUMENTS

| | | | |
|---|---|---|---|
| 4,898,395 | 2/1990 | Kawase | 141/312 |
| 4,924,923 | 5/1990 | Boehmer et al. | 141/312 |
| 5,305,903 | 4/1994 | Harde | 141/312 |

*Primary Examiner*—David J. Walczak
*Assistant Examiner*—Timothy L. Maust
*Attorney, Agent, or Firm*—Kenyon & Kenyon

[57] ABSTRACT

A dispensing nozzle seal that can be inserted into the filler neck of a fuel tank. The nozzle seal has a sealing ring made of elastomeric material with a sealing lip that is configured to sealingly surround with a degree of elastic prestressing a dispensing nozzle that is inserted into the filler neck. The sealing ring is joined to a seal support tapering conically in the direction of the fuel tank. The seal support is constructed in one piece, and is connected frictionally or with form locking to the sealing ring.

16 Claims, 2 Drawing Sheets

DISPENSING NOZZLE SEAL

BACKGROUND OF THE INVENTION

The present invention pertains to a dispensing or gas-hose nozzle seal that can be inserted into the filler neck of a fuel tank, comprising a sealing ring made of elastomeric material having a sealing lip that sealingly surrounds a dispensing nozzle inserted into the filler neck with elastic prestressing. The sealing ring is joined to a seal support that tapers conically in the direction of the fuel tank.

This general type of dispensing nozzle seal is known from DE 38 29 948 A1, which teaches a dispensing nozzle seal having a sealing ring which is housed in a receptacle element of essentially annular shape. The receptacle element is constructed elastically at least in one partial area, and, by a reversible reduction of its diameter, can be inserted into the filler neck through the mouth. The support element is joined with form locking to a projection of the filler neck projecting radially inwards and is thus held in place axially. The sealing ring is housed in a two-part seal support, which consists of a seal housing element and a closure element, wherein the seal housing element surrounds the sealing ring on the side facing the fuel tank and the side facing radially outwards with an angular profile. The seal housing element and the closure element together form a groove open to the outside, into which the sealing ring can be inserted. The sealing ring has the shape of an ordinary commercial lip seal.

SUMMARY OF THE INVENTION

The present invention is directed to the problem of providing a structure having few parts that can be simply produced at reasonable expense in terms of both economics and process-engineering, and providing a simpler installation of the dispensing nozzle (i.e., gas-hose) seal in the filler neck.

The present invention solves these problems by providing a dispensing nozzle seal that can be inserted into the filler neck of a fuel tank. It comprises a unitary seal support which tapers conically in the direction of the fuel tank and an elastomeric sealing ring that has a sealing lip configured to sealingly surround a dispensing nozzle inserted into the filler neck with elastic prestressing. The seal support is formed in one piece and can be connected to the sealing ring either frictionally or with form locking. The use of a design in which a one-piece seal support is connected to the sealing ring is of particular advantage, in that it simplifies both installation of the dispensing nozzle seal in the filler neck and the exchange of sealing rings with a minimal risk of damage. By providing a preassembled unit comprising the seal support and the sealing ring, the handling of the dispensing nozzle seal according to the invention is considerably simplified.

According to one advantageous embodiment of the invention, the seal support is shaped as an entry cone for the dispensing nozzle, and the sealing ring is arranged on the side of the seal support facing the fuel tank. Hence, when filling the fuel tank, the dispensing nozzle is inserted into the insertion-cone shaped seal support and thereby is automatically centered with respect to the sealing ring. Subsequently, the dispensing nozzle is guided through the sealing ring connected to the seal support. The sealing lip of the sealing ring sealingly surrounds the dispensing nozzle over its entire circumference with a largely uniform contact pressure. Because the seal support is connected to the sealing ring and is designed as a unit, the allocation of the two parts to one another is particularly precise under all operating conditions. Any partial overloading of the sealing lip caused by an eccentricity with respect to the seal support and hence to the gas hose nozzle is ruled out by the configuration taught by the invention. The dispensing nozzle seal therefore has good usage characteristics that remain uniform over its entire service life.

The seal support consists of a tough and hard material. Polymer materials resistant to the medium to be sealed, e.g., polyamide, are preferably used. Even strong mechanical stress, as results, for instance, from frequent insertion of dispensing nozzles into the filler neck, causes only a negligibly small abrasive wear on the inside of the seal support during the entire service life of the dispensing nozzle seal.

To fasten the seal support in the filler neck, the seal support can have, on the side facing away from the sealing ring, at least one elastic tongue able to move flexibly inwards and outwards radially which can be brought into engagement frictionally or with form locking with the filler neck. In order to ensure a reliable and axially immovable seating of the seal support inside the filler neck, the seal support on the side facing away from the sealing ring is preferably constructed at least in the area of the elastic tongues with a flange projection pointing radially outward. The surface of the filler neck facing the flange projection can be provided with surface profiling to guarantee a stable positioning of the seal support inside the filler neck due to the relatively higher surface roughness. The surface profiling can be formed, for example, by turned grooved recesses open essentially in the radial direction inwardly, so that the flange projection can snap into the depression. A different surface profiling, knurling, for instance, can be provided alternatively to achieve a positive and/or non-positive connection of the unit consisting of seal support and sealing ring in the filler neck.

The elastic tongue can be delimited peripherally by recesses extending axially, where the ratio of the axial length of the seal support to the length of the recesses in the same direction is 1.3:1 to 4:1, and preferably in the range of 1.5:1 to 3:1. The length of the recesses in the axial direction has crucial influence on the effective prestressing in the radial direction on the inner circumference of the filler neck. The length of the recesses in relation to the length of the seal support is be designed such that there is, on the one hand, a sufficiently great radial contact pressure of the elastic tongues on the filler neck and, on the other hand, a sufficient elastic yielding even if the dispensing nozzle is introduced into the filler neck while eccentrically displaced with regard to the seal support.

According to an advantageous configuration, it is provided that the seal support has two elastic tongues distributed uniformly in the circumferential direction. During the installation of the seal support in the filler neck, the two parts are thereby automatically centered with respect to one another. Moreover, a secure fastening of the seal support inside the filler neck is assured, even if one of the two elastic tongues fails, due to damage, for instance.

The sealing ring preferably is equipped with a reinforcement of a tough and hard material, the reinforcement being capable of snapping into an undercut of the seal support and being detachably connected to it without destruction. The reinforcement can be formed, for instance, of a ring consisting of a metal material onto which the elastomeric material of the sealing ring is vulcanized. The metal ring does not exhibit any relaxation phenomena during the entire service life of the dispensing nozzle seal, so that the sealing ring is reliably retained on the seal support. In case of damage to the sealing ring, it is possible to remove the unit consisting of sealing ring and seal support from the filler neck, separate the sealing ring and the seal support nondestructively, and snap a new sealing ring into the undercut of the seal support. The unit consisting of the new sealing ring and the old seal support is then snapped back into the filler neck. In a further embodiment, an inseparable construction between the two is also possible.

According to another configuration, the elastomeric material of the sealing ring is molded directly onto the polymer material of the seal support. Such an embodiment is particularly economical.

The sealing ring also has a statically stressed seal, which is formed in one continuous piece with and of the same material as the sealing lip. It is of advantage here that the dispensing nozzle seal has a simple structure with few parts and is therefore easily installed in the filler neck. Installation errors are reduced to a minimum by a one-piece construction of the seal and the sealing lip on the sealing ring.

The seal can be provided on its outer circumference with a corrugated profile extending in the axial direction. It is of advantage here that a radial pre-centering takes place in the area of the corrugated profile during installation of the dispensing nozzle seal in the filler neck. Also of advantage with the corrugated profile is that it forms a labyrinth seal and therefore excellent sealing results are guaranteed over a long service life.

The seal is preferably provided on its end face pointing away from the seal support with two concentrically arranged sealing beads which are adjacently allocated to one another with radial clearance. Manufacturing tolerances of the sealing ring and/or the filler neck can be compensated for by both the configuration of the corrugated profile arranged on the outer circumference and the mutually concentrically surrounding sealing beads. Tighter tolerances, which are disadvantageous in both economic and process-engineering terms, are therefore not required.

The sealing lip is connected in an articulated manner to the sealing ring by a connection area of reduced cross section. This permits an insertion of the dispensing nozzle without exertion of great force. Filling the fuel tank at low temperatures is thus possible without problems, despite the stiffening of the polymer material that often occurs as low temperatures, without danger of damaging the sealing ring. Due to the thicker area of the sealing lip in comparison to the connection area, mechanical support of the dispensing nozzle is provided while inserted into the filler neck without damaging the sealing lip. In case of an extremely tilted position of the dispensing nozzle, the articulated connecting area deforms and the sealing lip rests against the seal.

DETAILED DESCRIPTION

Figure 1:
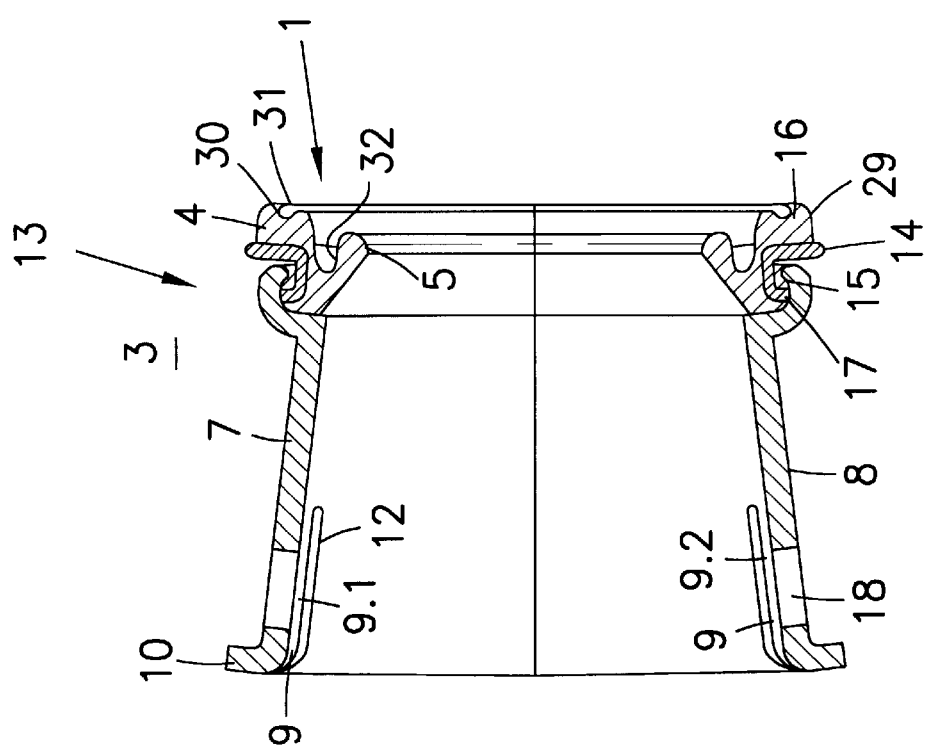
FIG. 1 is a cross-sectional view of a unit consisting of the seal and the seal support constructed according to the principles of the invention.

An embodiment of a dispensing nozzle seal 1 is schematically illustrated in enlarged scale in FIG. 1. The dispensing nozzle seal 1 consists of a sealing ring 4 made of elastomeric material and of a seal support 7, which in this embodiment is made of a wear-resistant polyamide. The sealing ring 4 is provided with a dynamically stressed sealing lip 5, which sealingly surrounds a dispensing nozzle (not shown here) with a degree of elastic prestressing. The sealing ring 4 is further equipped with a statically stressed seal 16 which statically seals off the axially adjacent spaces separated by the dispensing nozzle to seal one against the other. The sealing lip 5 and the seal 16 are formed in one continuous piece in this embodiment, consist of a uniform material, and are vulcanized onto a reinforcement 14 made of metallic material. On its outer circumference, the seal 16 is provided with a corrugated profile 29 extending axially and on its end face pointing away from the seal support 7 with two adjacent concentrically arranged sealing beads 30 and 31 spaced radially apart. To ensure good flexibility of the sealing lip 5 in the radial direction, the sealing ring 4 is provided with a connecting region 32 of reduced cross section, the connecting region 32 joining the sealing lip 5 in articulated fashion to the seal 16 of the sealing ring 4. The sealing ring 4 and the seal support 7 are joined together with form locking. The seal support 7 has an undercut 15, into which a projection 17 of the reinforcement 14 can be snapped.

The dispensing nozzle seal illustrated here is formed with two elastic tongues 9.1 and 9.2, uniformly distributed in the circumferential direction, the elastic tongues 9.1, 9.2 each being equipped on the side turned away from the sealing ring 4 with a flange projection 10 extending radially outwards.

Openings 18 are provided so that it is possible to install the dispensing nozzle seal in the filler neck and remove it from the filler neck with an engaging tool.

The ratio of the axial length of the seal support 7 to the length of the recesses 12 in the same direction is 2.5 in the illustrated embodiment.

Figure 2:
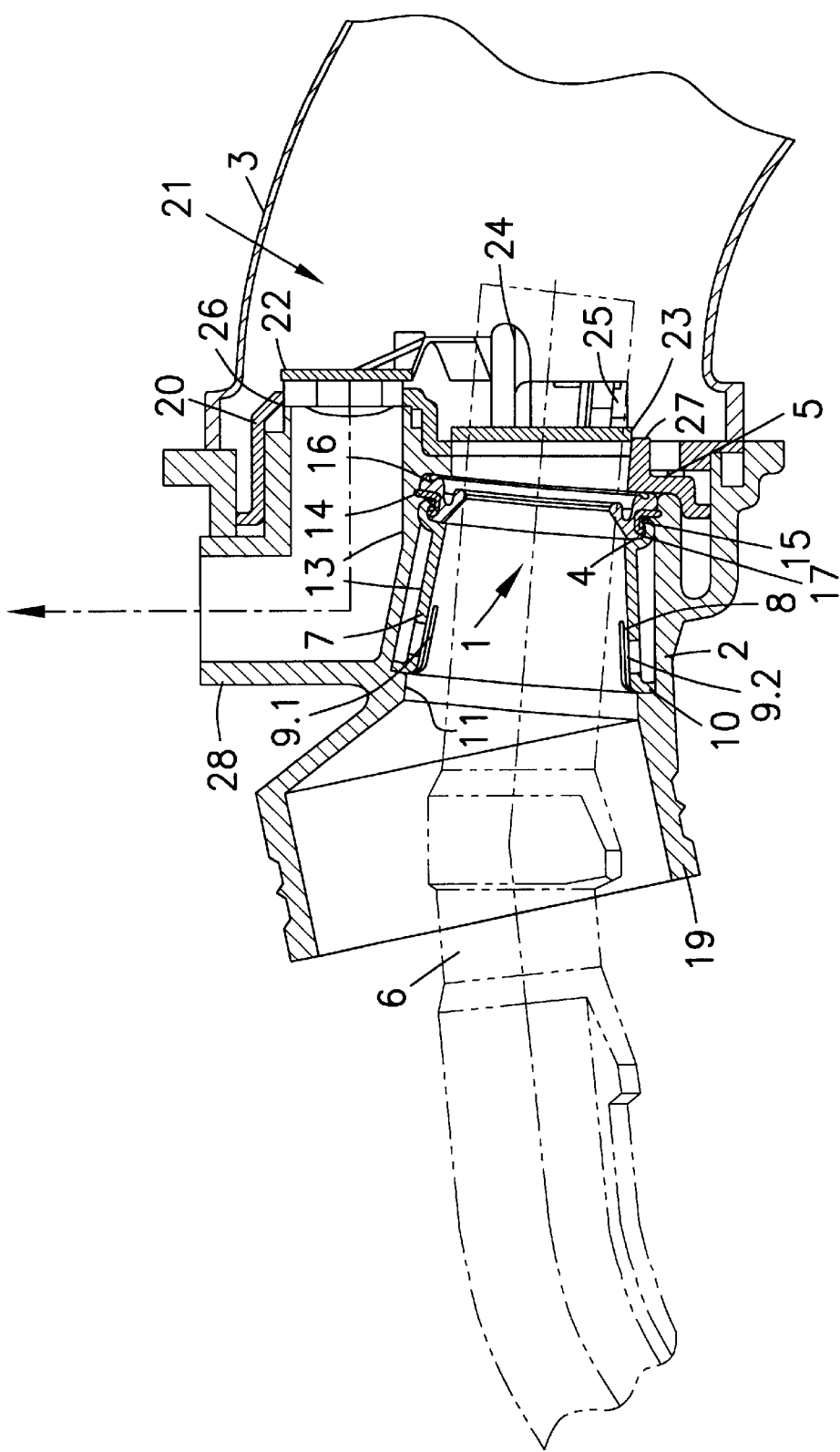
FIG. 2 shows the unit shown in FIG. 1, installed in the filler neck of a fuel tank.

In FIG. 2, the unit 13, consisting of the sealing ring 4 and the seal support 7 of FIG. 1, is shown in the installed state. The unit 13 is arranged in a locking receptacle 19 connected sealingly to a valve support 20. On its side facing away from the fuel tank 3, the filler neck 2 has the locking receptacle 19 with the valve support 20, a closure flap 22 constructed as a valve 21 and a filling flap 23 forming components of the valve support 20, each flap being capable of pivoting about an axis 24, 25 respectively and of making contact under spring force with a valve seat 26, 27 in the valve support 20. The closure flap 22 and the filling flap 23 are mechanically coupled by a tappet device and can both be brought into the open position by insertion of the dispensing nozzle 6 through the filling flap 23 and into the filler neck 2.

The locking receptacle 19 is provided with a connector flange 28 for a ventilation line, volatile fuel components from the free space of the fuel tank 3 being fed through the connector flange 28 into a storage chamber not represented here, which is filled, for example, with an activated charcoal filter.

In the state illustrated here, the closure flap 22 is in gas-tight engagement with its valve seat 26 in order to prevent liquid fuel components from penetrating into the storage chamber and causing an impairment of the activated charcoal filter.

The apparatus operates as follows. In order to fill the fuel tank 3, the dispensing nozzle 6 (represented in FIG. 2 in dot-dash lines) is inserted after removal of a tank lid into the locking receptacle 19, and, during the insertion of the nozzle through the seal support 7 shaped with a conical taper in the direction of the fuel tank 3, it is centered with respect to the sealing ring 4. Subsequently, the dispensing nozzle is guided through the sealing ring 4, the sealing lip 5 making sealing contact under elastic prestressing with the outer perimeter of the dispensing nozzle 6. Then the filling flap 23 is first brought into the open position by the introduction of the dispensing nozzle into the filler neck, and, subsequently, with a time delay, the closure flap 22 is opened. During the filling of the fuel tank 3, the volatile fuel components in the free space of the fuel tank move past the closure flap 22 into the connector flange 28 and from there, via a ventilation line, into an absorption element, not illustrated here, which is arranged in a storage chamber. The regeneration of the absorption element is done as a function of the load state of the connected internal combustion engine in that, as a function of the negative pressure prevailing in the induction pipe of an internal combustion engine, fresh air and the volatile fuel components stored in the absorption element are fed to the internal combustion engine for combustion.

The unit 13 is retained in the filler neck 2 by engagement with the flange projections 10 of the two elastic tongues 9 of the seal support 7, which are distributed uniformly over the circumference of the seal support.

What is claimed is:

1. A dispensing nozzle seal that can be inserted into the filler neck of a fuel tank, comprising:

a unitary seal support which tapers conically in the direction of the fuel tank, defining an axial direction;

an elastomeric sealing ring that has a sealing lip configured to sealingly surround a dispensing nozzle inserted into the filler neck with elastic prestressing wherein the seal support functions as an insertion cone for the dispensing nozzle, and the sealing ring is arranged forward of the seal support on a side of the seal support such that it faces the fuel tank; and wherein the sealing ring is joined to the seal support via a frictional or form lock.

2. A dispensing nozzle seal as set forth in claim 1, wherein the seal support consists of a tough and hard material.

3. A dispensing nozzle seal as set forth in claims 1, wherein the sealing ring is joined to the seal support on one side of the seal support, and wherein the seal support has, on the side facing away from the sealing ring, at least one elastic tongue, capable of moving resiliently inwards and outwards radially, which can be brought frictionally or with form locking into engagement with a filler neck.

4. A dispensing nozzle seal as set forth in claim 3, wherein the seal support comprises a radially outwardly-directed flange projection on the side of the seal support that faces away from the sealing ring in the area of the elastic tongue.

5. A dispensing nozzle seal according to claim 4, further comprising a filler neck having a surface that faces the flange projection, and wherein the surface of the filler neck facing the flange projection is a profiled surface.

6. A dispensing nozzle seal as set forth in claim 3, wherein the elastic tongue is delimited by recesses extending in the axial direction, and the ratio of the axial length of the seal support to the length of the recesses extending in the same direction is in the range of 1.3:1 to 4:1.

7. A dispensing nozzle seal that can be inserted into the filler neck of a fuel tank, comprising:

a unitary seal support which tapers conically in the direction of the fuel tank, the seal support having two elastic tongues uniformly distributed along the circumference of the seal support: and an elastomeric sealing ring that has a sealing lip configured to sealingly surround a dispensing nozzle inserted into the filler neck with elastic prestressing:

wherein the sealing ring is joined to the seal support via a frictional or form lock.

8. A dispensing nozzle seal that can be inserted into the filler neck of a fuel tank, comprising:

a unitary seal support which tapers conically in the direction of the fuel tank: and an elastomeric sealing ring that has a sealing lip configured to sealingly surround a dispensing nozzle inserted into the filler neck with elastic prestressing:

wherein the sealing ring is joined to the seal support via a frictional or form lock, and wherein the sealing ring is joined to the seal support on one side of the seal support, and wherein the seal support has, on the side facing away from the sealing ring, two elastic tongues uniformly distributed along the circumference of the seal support, capable of moving resiliently inwards and outwards radially, which can be brought frictionally or with form locking into engagement with a filler neck.

9. A dispensing nozzle seal as set forth in claim 1, wherein the seal support and sealing ring form a preassembled unit.

10. A dispensing nozzle seal as set forth in claim 1, wherein the seal support has an undercut, the sealing ring is equipped with a reinforcement that is made of a tough and hard material, and wherein the reinforcement can snap into the undercut of the seal support and be connected to it in a nondestructively detachable manner.

11. A dispensing nozzle seal as set forth in claim 1, wherein the sealing ring has a statically stressed seal which is formed continuously in one piece with and of the same material as the sealing lip.

12. A dispensing nozzle seal as set forth in claim 10, wherein the seal is provided on its outer circumference with a corrugated profile that extends in the axial direction.

13. A dispensing nozzle seal as set forth in claim 11, wherein the seal is provided on its outer circumference with a corrugated profile that extends in the axial direction.

14. A dispensing nozzle seal as set forth in claim 10, wherein the seal is provided on an end face pointing away from the seal support with two concentrically arranged sealing beads, arranged side by side with radial clearance between them.

15. A dispensing nozzle seal that can be inserted into the filler neck of a fuel tank, comprising:

a unitary seal support which tapers conically in the direction of the fuel tank: and an elastomeric sealing ring that has a sealing lip configured to sealingly surround a dispensing nozzle inserted into the filler neck with elastic prestressing;

wherein the sealing ring is joined to the seal support via a frictional or form lock and has a statically stressed seal which is formed continuously in one piece with and of the same material as the sealing lip, and wherein the seal is provided on an end face pointing away from the seal support with two concentrically arranged sealing beads, arranged side by side with radial clearance between them.

16. A dispensing nozzle seal as set forth in claim 1, wherein the sealing lip is connected by a connecting area of reduced cross section in an articulated manner to the sealing ring.

* * * * *